(12) United States Patent
Rossi

(10) Patent No.: US 11,623,628 B2
(45) Date of Patent: Apr. 11, 2023

(54) CONTROL METHOD AND CONTROL DEVICE FOR AUTOMATIC TRANSMISSION

(71) Applicant: Nissan Motor Co., Ltd., Yokohama (JP)

(72) Inventor: Sergio Rossi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 71 days.

(21) Appl. No.: 17/204,994

(22) Filed: Mar. 18, 2021

(65) Prior Publication Data

US 2021/0291831 A1    Sep. 23, 2021

(30) Foreign Application Priority Data

Mar. 18, 2020    (JP) .............................. JP2020-048039

(51) Int. Cl.
*B60W 10/11* (2012.01)
*F16H 59/44* (2006.01)

(52) U.S. Cl.
CPC ......... *B60W 10/11* (2013.01); *B60W 2520/10* (2013.01); *B60W 2520/105* (2013.01)

(58) Field of Classification Search
CPC combination set(s) only.
See application file for complete search history.

(56) References Cited

U.S. PATENT DOCUMENTS

| | | | |
|---|---|---|---|
| 2014/0066251 A1* | 3/2014 | Kawamoto | B60W 20/30 180/65.265 |
| 2016/0167663 A1* | 6/2016 | Sutton | B60W 50/085 701/53 |
| 2016/0201797 A1* | 7/2016 | Lowndes | F16H 61/16 477/115 |
| 2016/0208914 A1* | 7/2016 | Kondou | F16H 61/18 |
| 2017/0356381 A1* | 12/2017 | Richards | F02D 41/3094 |
| 2018/0148063 A1* | 5/2018 | Tatsushiro | B60W 30/18009 |
| 2019/0061738 A1* | 2/2019 | Goto | F16H 61/0204 |
| 2019/0100214 A1* | 4/2019 | Kato | B60W 10/30 |
| 2019/0129439 A1* | 5/2019 | Kishi | B60W 30/10 |
| 2019/0154143 A1* | 5/2019 | Ganske | F16H 59/66 |
| 2019/0161069 A1* | 5/2019 | Yui | B60L 50/61 |
| 2019/0162298 A1* | 5/2019 | Takeichi | F16H 61/0213 |
| 2019/0250629 A1* | 8/2019 | Mizuno | B60W 60/001 |
| 2020/0031345 A1* | 1/2020 | Yamada | B60W 10/06 |
| 2020/0132188 A1* | 4/2020 | Fujiwara | F16H 61/08 |
| 2020/0171956 A1* | 6/2020 | Park | B60T 7/12 |
| 2020/0200262 A1* | 6/2020 | Ooshima | F16H 61/16 |
| 2021/0054926 A1* | 2/2021 | Kawale | F16H 61/0213 |

FOREIGN PATENT DOCUMENTS

JP  2012192875 A  * 10/2012  .......... B60K 17/348
JP  2014-237391 A     12/2014

* cited by examiner

*Primary Examiner* — Anne Marie Antonucci
*Assistant Examiner* — Amelia Vorce
(74) *Attorney, Agent, or Firm* — Global IP Counselors, LLP

(57) ABSTRACT

An automatic transmission control method and an automatic transmission control device control upshifting and downshifting of an automatic transmission of a vehicle. An electronic controller limits a number of continuous upshifts or downshifts during continuous execution of upshifts or downshifts during cruise control.

6 Claims, 3 Drawing Sheets

CONTROL METHOD AND CONTROL DEVICE FOR AUTOMATIC TRANSMISSION

CROSS-REFERENCE TO RELATED APPLICATIONS

This application claims priority to Japanese Patent Application No. 2020-048039, filed on Mar. 18, 2020. The entire disclosure of Japanese Patent Application No. 2020-048039 is hereby incorporated herein by reference.

BACKGROUND

Technical Field

The present invention generally relates to a control method and a control device for an automatic transmission.

Background Information

Japanese Laid-Open Patent Application No. 2014-237391 discloses a technology in which, during cruise control if the vehicle speed overshoots the target vehicle speed on a downhill road, the automatic transmission is downshifted to increase the engine braking force, after which, when the vehicle speed converges to the target vehicle speed, the automatic transmission is upshifted to reduce the engine braking force, in order to bring the vehicle speed to the target vehicle speed.

SUMMARY

In the Japanese publication described above, if the vehicle continues to decelerate even after an upshift, the upshifting may continue; however, continuous upshifting may result in "busy-shifting," which may make the driver uncomfortable. One object of the present disclosure is to provide a control method and a control device for an automatic transmission that can suppress busy-shifting.

In the control method and the control device of the present disclosure, when an automatic transmission continuous to be upshifted or downshifted during constant speed travel, the number of continuous upshifts or downshifts is limited.

As a result, busy-shifting can be suppressed by the control method and the control device of the present disclosure.

BRIEF DESCRIPTION OF THE DRAWINGS

Referring now to the attached drawings which form a part of this original disclosure.

FIG. 1

DETAILED DESCRIPTION OF EMBODIMENTS

Selected embodiments will now be explained with reference to the drawings. It will be apparent to those skilled in the automatic transmission field from this disclosure that the following descriptions of the embodiments are provided for illustration only and not for the purpose of limiting the invention as defined by the appended claims and their equivalents.

First Embodiment

Figure 1:
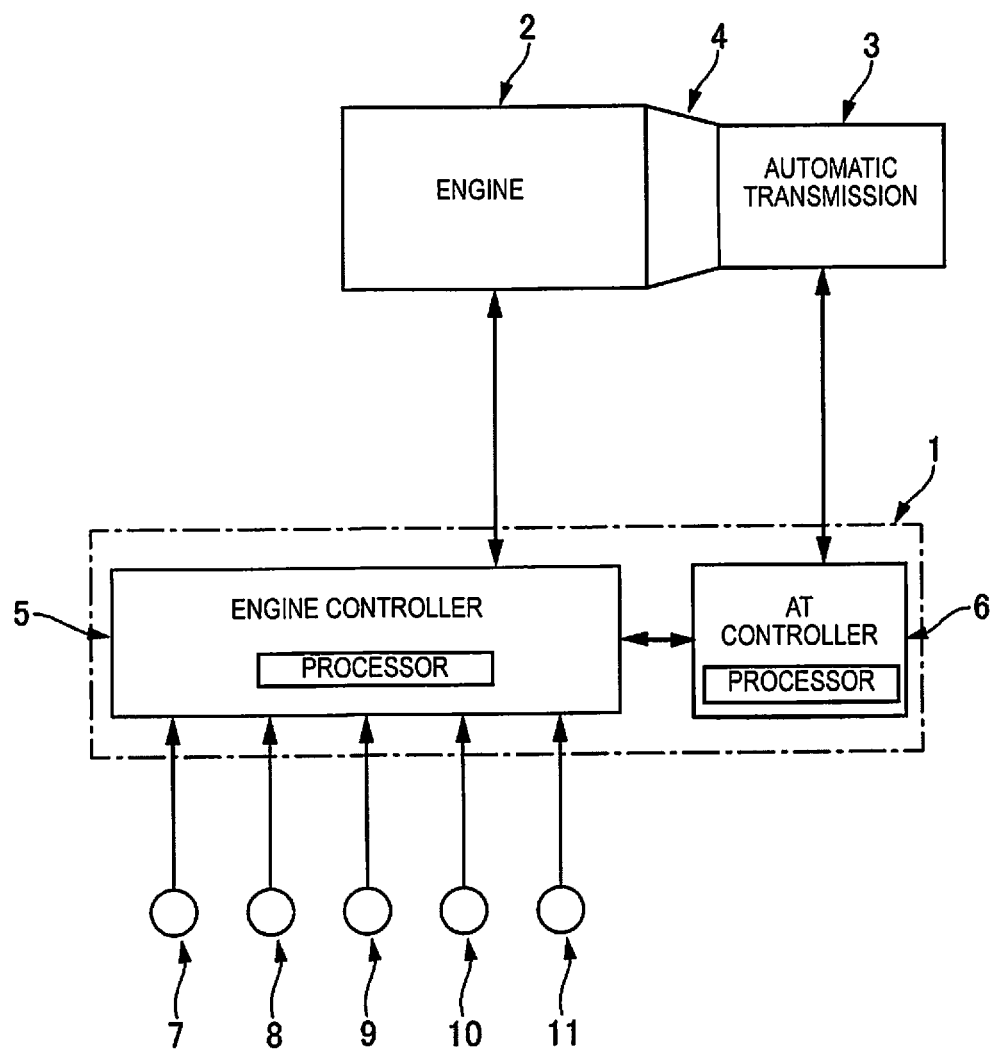
FIG. 1 is a block diagram of a vehicle travel control device 1 according to a first embodiment.

FIG. 1 is a block diagram of a vehicle travel control device 1 according to a first embodiment. A vehicle has an engine 2 as a power source for travel. The output of the engine 2 is input to an automatic transmission (hereinafter referred to as AT3) via a torque converter 4, shifted in accordance with a desired transmission ratio, and then transmitted to the drive wheels, not shown. The AT3 is a stepped transmission with nine forward gears and one reverse gear. The engine 2 and the AT3 are controlled by the travel control device 1. The travel control device 1 includes an engine controller 5 that controls the engine 2, and an AT controller 6 that controls the AT3.

The engine controller 5 and the AT controller 6 are examples of electronic controllers that include at least one processor for executing control programs stored in memory. The term "electronic controller" as used herein refers to hardware that executes a software program, and does not include a human. While the engine controller 5 and the AT controller 6 are illustrated in FIG. 1 as separate components, it will be apparent from this disclosure that the engine controller 5 and the AT controller 6 can be combined into a single component that includes one or more processors.

Signals from an accelerator pedal sensor 7, a cruise control switch 8, a vehicle speed sensor 9, an engine rotation speed sensor 10, and an acceleration sensor 11 are input to the travel control device 1. The accelerator pedal sensor 7 detects the amount by which the driver has depressed the accelerator pedal (accelerator opening degree). The cruise control switch 8 is used by the driver to set the speed (setting the target cruise vehicle speed), increase or decrease the speed, or to cancel cruise control (constant speed travel control). The vehicle speed sensor 9 detects the vehicle speed. The engine rotation speed sensor 10 detects the engine rotation speed. The acceleration sensor 11 detects the longitudinal acceleration of the vehicle (hereinafter, simply referred to as acceleration). The term "sensor" as used herein also refers to a hardware device or instrument designed to detect the presence of a particular object or substance and to emit a signal in response. The term "sensor" as used herein also do not include a human.

The engine controller 5 controls the amount of intake air of a throttle actuator of the engine 2, the amount of fuel injected by an injector, and the ignition timing of a spark plug in accordance with the accelerator opening degree detected by the accelerator pedal sensor 7 and the vehicle speed detected by the vehicle speed sensor 9. The AT controller 6 uses hydraulic oil from an engine-driven oil pump as a medium to control the shifting of the AT3, in accordance with the accelerator opening degree, the vehicle speed, the operating position of a select lever operated by the driver, or a shift request from the engine controller 5.

If cruise control is turned on using the cruise control switch 8, the engine controller 5 executes cruise control for controlling the amount of intake air of a throttle actuator of the engine 9, the fuel injection amount of an injector, and the ignition timing of a spark plug, in accordance with the accelerator opening degree detected by the accelerator pedal sensor 2 and the vehicle speed detected by the vehicle speed sensor 8. If the vehicle speed deviates from the target cruise vehicle speed during cruise control on a downhill road, the engine controller 5 executes the downhill shift control shown below, in an aim to converge the vehicle speed to the target cruise vehicle speed.

Figure 2:
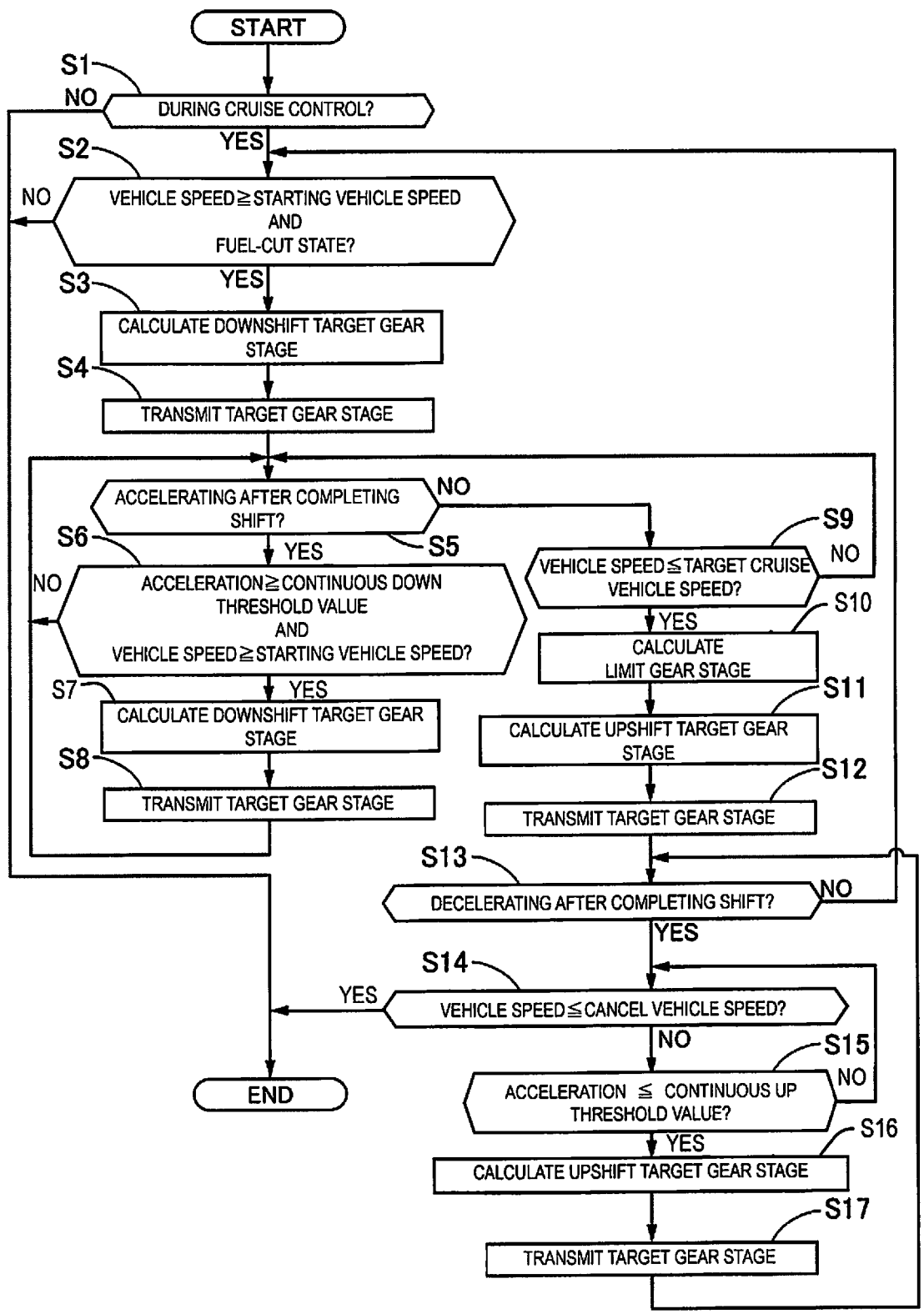
FIG. 2 is a flowchart illustrating the flow of a downhill shift control during cruise control.

FIG. 2 is a flowchart illustrating the process flow of a downhill shift control during cruise control.

In Step S1, it is determined whether cruise control is in progress. If YES, the process proceeds to Step S2, and if NO, the downhill shift control is ended.

In Step S2, it is determined whether the vehicle speed is greater than or equal to a starting vehicle speed, and the engine 2 is in a fuel cut state. If YES, the process proceeds to Step S3, and if NO, the downhill shift control is ended. The starting vehicle speed is set to a vehicle speed that exceeds the target cruise vehicle speed by a prescribed value α and at which it can be determined that the vehicle is traveling on a downhill road. That is, if the vehicle speed exceeds the target cruise vehicle speed by the prescribed value α or more during coasting travel, it can be determined that the vehicle is traveling on a downhill road.

In Step S3, a downshift target gear stage is calculated. The downshift target gear stage is the gear stage that is one step lower than the current gear stage of the AT3.

In Step S4, a shift request it output to the AT controller 6 to set the gear stage of the AT3 to the target gear stage calculated in Step S3.

In Step S5, after the shifting (downshifting) has been completed, it is determined whether the vehicle is accelerating. If YES, the process proceeds to Step S6, and if NO, the process proceeds to Step S9. In this step, if the sign of the acceleration detected by the acceleration sensor 11 is positive, it is determined that the vehicle is accelerating.

In Step S6, it is determined whether the state in which the acceleration is greater than or equal to a continuous down threshold value has continued for a prescribed period of time, and the vehicle speed is greater than or equal to the starting vehicle speed. If YES, the process proceeds to Step S7, and if NO, the process proceeds to Step S5. The continuous down threshold value is set to a prescribed positive acceleration that is higher than 0 (G).

In Step S7, the downshift target gear stage is calculated. The downshift target gear stage is the gear stage that is one step lower than the current gear stage.

In Step S8, a shift request it output to the AT controller 6 to set the gear stage of the AT3 to the target gear stage calculated in Step S7.

In Step S9, it is determined whether the vehicle speed is less than or equal to the target cruise vehicle speed (first condition). If YES, the process proceeds to Step S10, and if NO, the process proceeds to Step S5. In this step, it is determined whether the vehicle speed has converged to the target vehicle speed. Instead of the determination described above, it may be determined whether the vehicle speed is less than or equal to the target cruise vehicle speed+a prescribed value. The target cruise vehicle speed+the prescribed value is set to a vehicle speed that is lower than the starting vehicle speed and that is close to the target cruise vehicle speed.

In Step S10, an upshift limit gear stage is calculated. The limit gear stage is the gear stage obtained by adding a limit number of gears to the current gear stage. The limit number of gears is increased as the current gear stage becomes lower. For example, in the case of nine forward gears, if the current gear stage is 3rd to the 5th gears, the limit number of gears is set to two, and if the current gear stage is 6th to the 8th gears, the limit number of gears is set to one gear. Here, the first and second gears are gear stages that are not used during cruise control, and the ninth gear is the highest gear stage, so that the limit gear stage is zero when the current gear stage is the first, second, or ninth gear.

The calculation of the limit gear stage in Step S10 is carried out only once after starting the downhill shift control. That is, if the limit gear stage is already set, the limit gear stage is not recalculated, and the already-set limit gear stage is kept.

In Step S11, an upshift target gear stage is calculated. The upshift target gear stage is the gear stage that is one step higher than the current gear stage.

In Step S12, a shift request it output to the AT controller 6 to set the gear stage of the AT3 to the target gear stage calculated in Step S11.

In Step S13, after the shifting (upshifting) has been completed, it is determined whether the vehicle is decelerating (second condition). If YES, the process proceeds to Step S14, and if NO, the process proceeds to Step S2. In this step, if the sign of the acceleration detected by the acceleration sensor 11 is negative, it is determined that the vehicle is decelerating.

In Step S14, it is determined whether the vehicle speed is less than or equal to a cancel vehicle speed. If YES, the downhill shift control is ended, and if NO, the process proceeds to Step S15. The cancel vehicle speed is set to a vehicle speed that is lower than the target cruise vehicle speed by a prescribed value β and at which it can be determined that the vehicle speed cannot be increased to the target cruise vehicle speed by only adjusting the engine braking force by an upshift.

In Step S15, it is determined whether the state in which the acceleration is less than or equal to a continuous up threshold value has continued for a prescribed period of time. If YES, the process proceeds to Step S16, and if NO, the process proceeds to Step S14. The continuous down threshold value is set to a prescribed negative acceleration that is lower than 0 (G).

In Step S16, an upshift target gear stage is calculated. In this step, the upshift target gear stage is determined by selecting the lower of the gear stage that is one step higher than the current gear stage, and the limit gear stage calculated in Step S10.

In Step S17, a shift request it output to the AT controller 6 to set the gear stage of the AT3 to the target gear stage calculated in Step S16.

The engine controller 5 stops the supply of fuel to the engine 2 during the downhill shift control described above, and restarts the supply of fuel to the engine 2 when the downhill shift control is ended.

Figure 3:
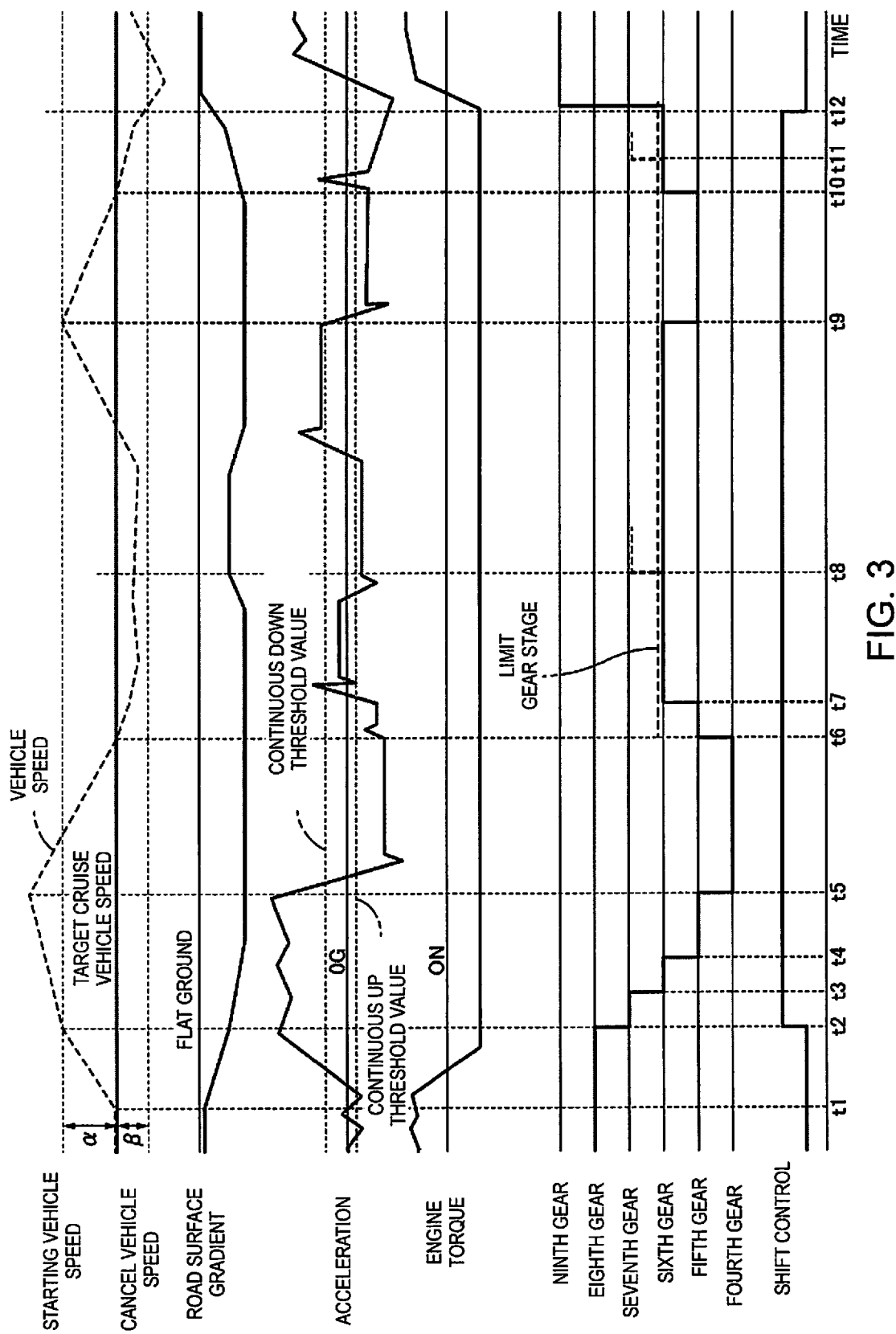
FIG. 3 is a timing chart of the downhill shift control during cruise control.

FIG. 3 is a timing chart of the downhill shift control during the cruise control.

At time t1, the vehicle begins travel on a downhill road during cruise control, and the engine 2 enters a fuel-cut state. In the period between time t1-t2, the difference between the vehicle speed and the target cruise vehicle speed gradually increases due to the downhill road.

At time t2, since the vehicle speed reaches the starting vehicle speed in the fuel-cut state of the engine 2, the shift control is started and the AT3 executes a downshift from the current eighth gear to the seventh gear.

At time t3, since a state in which the acceleration of the vehicle is greater than or equal to the continuous down threshold value has continued for a prescribed period of time, even after the shifting from the eighth gear to the seventh gear has been completed, and the vehicle speed is higher than the starting vehicle speed, the AT3 executes a downshift from the seventh gear to the sixth gear.

At time t4, since a state in which the acceleration of the vehicle is greater than or equal to the continuous down threshold value has continued for a prescribed period of time, even after the shifting from the seventh gear to the sixth gear has been completed, and the vehicle speed is higher than the starting vehicle speed, the AT3 executes a downshift from the sixth gear to the fifth gear.

At time t5, since a state in which the acceleration of the vehicle is greater than or equal to the continuous down threshold value has continued for a prescribed period of time, even after the shifting from the sixth gear to the fifth gear has been completed, and the vehicle speed is higher than the starting vehicle speed, the AT3 executes a downshift from the fifth gear to the fourth gear. In the period between time t5-t6, the vehicle switches from acceleration to deceleration.

At time t6, since the vehicle speed has decreased to the target cruise vehicle speed, the upshift limit gear stage is set to six gears, the current gear stage (fourth gear)+the limit number of gears (two gears), and the AT3 executes an upshift from fourth gear to fifth gear.

At time t7, since a state in which the acceleration of the vehicle is less than or equal to the continuous up threshold value has continued for a prescribed period of time, even after the shifting from the fourth gear to the fifth gear has been completed, the AT3 executes an upshift from the fifth gear to the sixth gear.

At time t8, the acceleration of the vehicle becomes less than or equal to the continuous up threshold value due to a change in the road surface gradient, but since the gear stage of the AT3 has already reached the sixth gear, which is the limit gear stage, an upshift to the seventh gear is suppressed.

At time t9, since the vehicle speed has reached the starting vehicle speed, the AT3 executes a downshift from the current sixth gear to the fifth gear.

At time t10, since the vehicle speed has decreased to the target cruise vehicle speed, the AT3 executes an upshift from the fifth gear to the sixth gear.

At time t11, the acceleration of the vehicle becomes less than or equal to the continuous up threshold value, but since the gear stage of the AT3 has already reached the sixth gear, which is the limit gear stage, an upshift to the seventh gear is suppressed.

At time t12, since the vehicle speed has decreased to the cancel vehicle speed, the shift control is ended.

As described above, in the vehicle travel control device 1 according to the first embodiment, when the vehicle speed becomes less than or equal to the target cruise vehicle speed during cruise control for converging the vehicle speed to the target cruise vehicle speed, the AT3 executes an upshift, and if, during continuous upshifting of the AT3, the vehicle enters a deceleration state after the upshift, the number of continuous upshifts is limited. It is thus possible to suppress busy-shifting, and to reduce driver discomfort.

As for the method for suppressing a busy-shifting, a method for maintaining the gear shift stage with a timer, or the like, to reduce the shifting frequency, or a method for reducing the upshift frequency by means of coordination with fuel-cut recovery or braking can be considered. However, in the former case, there is the concern of deteriorated ability to follow the target cruise vehicle speed. In addition, in the latter case, a large number of man-hours is required for the design change, which leads to significant increases in cost. In contrast, the method for suppressing busy-shifting according to the first embodiment limits the number of continuous upshifts. Thus, until the gear stage of the AT3 reaches the limit gear stage, upshifts can be executed without delay with respect to the change in the state of the vehicle (change in the vehicle speed or acceleration), so that it is possible to suppress deterioration of the ability to follow the target cruise vehicle speed. In addition, since a large number of man-hours are required to change the design, increased costs can be suppressed, The engine controller 5 executes an upshift of the AT3 when the vehicle speed become less than or equal to the target cruise vehicle speed, and, after the execution of the upshift, the engine controller continuously executes upshifts when the deceleration state of the vehicle continued. That is, if the vehicle speed converges to the target cruise vehicle speed, the engine braking force is decreased in order to suppress deviation of the vehicle speed from the target cruise vehicle speed. In addition, if the vehicle speed continues to decelerate even after the upshift, the engine braking force is continuously decreased in order to more reliably suppress a deviation of the vehicle speed from the target cruise vehicle speed.

Here, since the deceleration state of the vehicle is determined based on a detection signal of the acceleration sensor 11, during travel on a road surface on which there are large changes in gradient, if the acceleration fluctuates drastically, it may be erroneously determined that the vehicle speed is decreasing even when the vehicle speed is starting to increase, and upshifting may be repeated. In the first embodiment, the number of continuous upshifts is limited, so that busy-shifting can be suppressed even if an erroneous determination occurs.

When the vehicle speed becomes less than or equal to the target cruise vehicle speed, that is, when the gear stage of the AT3 at the time of starting the upshift becomes lower, the engine controller 5 increases the execution limit number. Here, since the engine braking force increases as the gear stage decreases, in order to reliably restore the vehicle speed to the target cruise vehicle speed, it is necessary to increase the margin of adjustment when the engine braking force is reduced more, as the gear stage decreases. Thus, by increasing the execution limit number as the gear stage decreases at the time of starting an upshift, it is possible to more reliably restore the vehicle speed to the target cruise vehicle speed, regardless of the gear stage at the time of starting the upshift.

The engine controller 5 ends the downhill shift control when the vehicle speed becomes less than or equal to the cancel vehicle speed. That is, when the vehicle speed falls below the target cruise vehicle speed by the prescribed value β or more, the limit on the continuous upshift using the limit gear stage is canceled. If the vehicle speed is decreasing significantly even though the engine braking force is reduced by an upshift, it can be determined that the decreasing gradient of the travel path has become gradual. For this reason, since the vehicle speed does not return to the target cruise vehicle speed even if upshifting is further executed, the limit on the continuous upshift is canceled in this case, the downhill shift control is ended, and normal cruise control is restored. Since the vehicle speed control by shifting switches to a vehicle speed control by use of the engine torque, it is possible to more reliably restore the vehicle speed to the target cruise vehicle speed.

OTHER EMBODIMENTS

Although an embodiment for implementing the present invention was described above based on the embodiment, specific configurations of the present invention are not limited by embodiments, and modifications that can be made without departing from the scope of the invention are also included in the present invention.

For example, in the first embodiment, an example was presented in which the number of continuous upshifts is limited, but the number of continuous downshifts can be limited as well.

The limit gear stage of the upshift can be arbitrarily set in accordance with the specification of the automatic transmission (the number of the gear shift stages or the transmission ratio of each of the gear stages), as long as it is set such that the execution limit number increases as the gear stage when the first condition is met decreases.

What is claimed is:

1. An automatic transmission control method comprising:
   detecting a vehicle speed of a vehicle using a vehicle speed sensor;
   selectively executing either an upshift or a downshift of an automatic transmission provided in a power transmission path from an engine to a drive wheel using at least one electronic controller upon determining a first condition is met during a constant speed travel control that converges the vehicle speed detected by the vehicle speed sensor to a target vehicle speed;
   upon determining that a second condition is met after the upshift or the downshift during the constant speed travel control, continuously executing either upshifts or downshifts of the automatic transmission while limiting a number of the upshifts or the downshifts being continuously executed; and
   determining whether the vehicle is traveling downhill during the constant speed travel control and determining whether the first condition and the second condition are met after determining that vehicle is traveling downhill,
   the determining whether the vehicle is traveling downhill being carried out such that the vehicle is determined to be traveling downhill when
      the vehicle speed is larger than a starting vehicle speed, the starting vehicle speed being larger than the target vehicle speed, and
      the engine is in a fuel-cut state.

2. The automatic transmission control method according to claim 1, wherein
   the at least one electronic controller cancels the limiting of the number of the upshifts or the downshifts being continuously executed upon determining that the vehicle speed has fallen below the target vehicle speed by at least a prescribed amount.

3. An automatic transmission control method comprising:
   detecting a vehicle speed of a vehicle using a vehicle speed sensor;
   selectively executing either an upshift or a downshift of an automatic transmission provided in a power transmission path from an engine to a drive wheel using at least one electronic controller upon determining a first condition is met during a constant speed travel control that converges the vehicle speed detected by the vehicle speed sensor to a target vehicle speed; and
   upon determining that a second condition is met after the upshift or the downshift during the constant speed travel control, using the at least one electronic controller to continuously execute upshifts of the automatic transmission while limiting a number of the upshifts being continuously executed,
   the first condition being determined to be met upon determining the vehicle speed is less than or equal to the target vehicle speed, and
   the second condition being determined to be met upon determining the vehicle speed is in a deceleration state.

4. The automatic transmission control method according to claim 3, wherein
   the at least one electronic controller increases an execution limit of the number of upshifts being continuously executed as a gear shift stage of the automatic transmission at a time of determining the first condition is met decreases.

5. The automatic transmission control method according to claim 3, wherein
   the at least one electronic controller cancels the limiting of the number of the upshifts upon determining that the vehicle speed has fallen below the target vehicle speed by at least a prescribed amount.

6. An automatic transmission control device comprising:
   a vehicle speed sensor configured to detect a vehicle speed of a vehicle equipped with the automatic transmission control device and an automatic transmission provided in a power transmission path from an engine to a drive wheel; and
   at least one electronic controller configured to execute either an upshift or a downshift of an automatic transmission upon determining a first condition is met during constant speed travel control that converges the vehicle speed detected by the vehicle speed sensor to a target vehicle speed,
   upon determining a second condition is met after the upshift or the downshift during the constant speed travel control, the at least one electronic controller continuously executing either upshifts or downshifts of the automatic transmission while limiting a number of the upshifts or the downshifts being continuously executed,
   the electronic controller being further configured to determine whether the vehicle is traveling downhill and to determine whether the first condition and the second condition are met when the constant speed travel control is being executed and the vehicle is traveling downhill,
   the electronic controller being configured to determine that the vehicle is traveling downhill when
      the vehicle speed is larger than a starting vehicle speed, the starting vehicle speed being larger than the target vehicle speed, and
      the engine is in a fuel-cut state.

* * * * *